(12) United States Patent
Steinmeyer et al.

(10) Patent No.: US 11,348,342 B2
(45) Date of Patent: May 31, 2022

(54) METHOD AND DEVICE IN A MOTOR VEHICLE FOR IMPROVED DATA FUSION IN AN ENVIRONMENT DETECTION

(71) Applicants: Volkswagen Aktiengesellschaft, Wolfsburg (DE); Audi AG, Ingolstadt (DE)

(72) Inventors: Simon Steinmeyer, Braunschweig (DE); Daniel Mossau, Wolfsburg (DE); Marek Musial, Berlin (DE); Oliver Birbach, Braunschweig (DE); Patrick Glässer, Paunzhausen (DE); Tim Kubertschak, Ingolstadt (DE)

(73) Assignees: VOLKSWAGEN AKTIENGESELLSCHAFT, Wolfsburg (DE); AUDI AG, Ingolstadt (DE)

( * ) Notice: Subject to any disclaimer, the term of this patent is extended or adjusted under 35 U.S.C. 154(b) by 929 days.

(21) Appl. No.: 15/749,994

(22) PCT Filed: Jul. 13, 2016

(86) PCT No.: PCT/EP2016/066650
§ 371 (c)(1),
(2) Date: Jul. 2, 2018

(87) PCT Pub. No.: WO2017/021119
PCT Pub. Date: Feb. 9, 2017

(65) Prior Publication Data
US 2018/0300563 A1 Oct. 18, 2018

(30) Foreign Application Priority Data
Aug. 3, 2015 (DE) .......................... 102015214743.6

(51) Int. Cl.
*G06F 16/29* (2019.01)
*G06V 20/58* (2022.01)
(Continued)

(52) U.S. Cl.
CPC .............. *G06V 20/586* (2022.01); *B60R 1/00* (2013.01); *B60W 40/04* (2013.01); *G01S 17/931* (2020.01);
(Continued)

(58) Field of Classification Search
CPC ........... G06K 9/00818; G06K 9/00791; G06K 9/3208; B60W 2554/20; G06T 2207/30261; G01C 21/3602; G01C 11/025
See application file for complete search history.

(56) References Cited

U.S. PATENT DOCUMENTS

| 8,134,479 B2 | 3/2012 | Suhr et al. ................. 340/932.2 |
| 2008/0056535 A1* | 3/2008 | Bergmann ......... G06K 9/00798 382/103 |

(Continued)

FOREIGN PATENT DOCUMENTS

| CN | 102310857 | 1/2012 | ............ B60W 30/06 |
| CN | 103119469 | 5/2013 | ............. G01S 15/93 |

(Continued)

OTHER PUBLICATIONS

International Search Report and Written Opinion, Application No. PCT/EP2016/066650, 16 pages, dated Nov. 15, 2016.

*Primary Examiner* — Kenneth J Malkowski
(74) *Attorney, Agent, or Firm* — Slayden Grubert Beard PLLC (57) ABSTRACT

The invention relates to a method for improved data fusion during environment detection in a motor vehicle (50), comprising the following steps: detecting (101) an environment (Continued)

(40) of the motor vehicle (50) using at least one sensor (2); recognising (102) objects (81) in measurement data (20) detected by the at least one sensor (2); fusioning (115) of the recognised objects (81) and the object positions thereof in an environment map (80), wherein a probability of existence is/will be assigned to objects (81) recorded in the environment map (80), and wherein the probability of existence of a recorded object (81) is reduced, when a free region (86, 86.1) is measured during the detection of the position of the recorded object, wherein a respective orientation attribute (60) is assigned to the objects (81) recorded in the environment map (80) and recorded in the environment map (80), and for a region in the sensor region (83.1, 83.2, 83.3) of the at least one sensor (2), in which a free region (86, 86.1) is measured, the probability of existence of an object (81) recorded in the region of the environment map (80) corresponding to the region is reduced in accordance with the assigned orientation attribute (60). The invention also relates to the associated device (1).

12 Claims, 9 Drawing Sheets (51) Int. Cl.
  *B60W 40/04* (2006.01)
  *G08G 1/14* (2006.01)
  *G08G 1/16* (2006.01)
  *G01S 17/931* (2020.01)
  *B60R 1/00* (2022.01)
  *G01S 13/931* (2020.01)
  *G01S 15/931* (2020.01)
(52) U.S. Cl.
  CPC .............. *G06F 16/29* (2019.01); *G06V 20/58* (2022.01); *G08G 1/14* (2013.01); *G08G 1/168* (2013.01); *B60R 2300/303* (2013.01); *B60W 2554/00* (2020.02); *G01S 2013/9314* (2013.01); *G01S 2015/932* (2013.01)

(56) References Cited

U.S. PATENT DOCUMENTS

| | | | |
|---|---|---|---|
| 2009/0228204 A1* | 9/2009 | Zavoli | G01S 19/49 701/532 |
| 2010/0020074 A1* | 1/2010 | Taborowski | G06T 7/70 345/420 |
| 2013/0162461 A1 | 6/2013 | Lucking | G01S 19/93 |
| 2014/0350792 A1 | 11/2014 | Schräbler | G08G 1/16 |
| 2015/0127239 A1* | 5/2015 | Breed | B60W 30/00 701/70 |
| 2015/0138310 A1* | 5/2015 | Fan | G06K 9/00791 348/36 |
| 2016/0063341 A1* | 3/2016 | Ogata | G06K 9/00791 382/103 |
| 2016/0139255 A1 | 5/2016 | Bueschenfeld et al. | 342/146 |
| 2017/0193312 A1* | 7/2017 | Ai | G06F 13/20 |
| 2017/0212513 A1* | 7/2017 | Iida | B60Q 9/00 |
| 2017/0225678 A1* | 8/2017 | Bariant | B60W 30/14 |

FOREIGN PATENT DOCUMENTS

| | | | |
|---|---|---|---|
| CN | 104067141 | 9/2014 | G01S 13/00 |
| CN | 104508724 | 4/2015 | G08G 1/16 |
| DE | 102004037871 B4 | 10/2006 | B60R 1/00 |
| DE | 102005026386 A1 | 12/2006 | G01S 13/93 |
| DE | 102006061390 A1 | 7/2008 | B60W 30/06 |
| DE | 102007056622 A1 | 5/2009 | B60W 30/06 |
| DE | 102009040373 A1 | 4/2011 | B60W 30/06 |
| DE | 10 2010 030 213 | 12/2011 | B60W 30/06 |
| DE | 102012014939 A1 | 1/2014 | B60W 30/08 |
| DE | 102012214307 A1 | 2/2014 | G01S 13/93 |
| DE | 102013018721 A1 | 6/2014 | G01S 13/93 |
| DE | 102009012435 B4 | 8/2014 | B60W 10/18 |
| DE | 102014223363 A1 | 5/2016 | G08G 1/133 |
| EP | 1550983 A1 | 7/2005 | B60Q 1/48 |
| EP | 2366503 A2 | 9/2011 | B25J 9/16 |
| GB | 2 481 324 | 12/2011 | B62D 15/02 |
| GB | 2507152 A | 4/2014 | G06T 19/00 |
| JP | 2013101485 A | 5/2013 | B60R 21/00 |
| WO | 2017/021119 A1 | 2/2017 | B60W 40/04 |

* cited by examiner

METHOD AND DEVICE IN A MOTOR VEHICLE FOR IMPROVED DATA FUSION IN AN ENVIRONMENT DETECTION

CROSS-REFERENCE TO RELATED APPLICATIONS

This application claims priority to DE Application No. 10 2015 214 743.6 filed Aug. 3, 2015, the contents of which are hereby incorporated by reference in their entirety.

TECHNICAL FIELD

The invention relates to a method and a device in a motor vehicle for improved data fusion during detection of the surroundings.

BACKGROUND

Modern motor vehicles offer a range of assistance systems that help the driver operate the motor vehicle. Such an assistance system is, for example, a parking assistant that optically or acoustically provides additional information to help with parking, such as the distance to adjacent motor vehicles or obstacles and emits a warning signal in the event of a collision hazard. Moreover, semiautomated and fully automated parking assistants are known.

In order to be able to provide auxiliary functions that indicate and/or monitor the distance to adjacent motor vehicles or obstacles, the parking assistants must always be informed about the state of the surroundings of the motor vehicle. Generally, the surroundings are detected with the assistance of sensors, for example by means of ultrasound, radar, laser, etc. By using the sensor data, objects in the surroundings are subsequently recognized, for example by pattern recognition methods, and are evaluated with regard to their position in the surroundings and/or are saved in a map of the surroundings for later retrieval.

A method for recognizing a parking space is known from DE 10 2007 056 622 A1. To determine a suitable parking space for a vehicle by means of sensors for measuring gaps between objects recognized to the side of the vehicle, where the sensors to measure gaps between objects recognized to the side of the vehicle can be activated to the right as well as the left of the vehicle, a check is performed, while the own vehicle is at a standstill, of whether the signals from the sensors change during the standstill. Recognition of a suitable parking space or an incipient parking space on a side of the vehicle is rejected as invalid when driving on after a standstill of the vehicle if the signals from the sensors have changed on this side of the vehicle during the previous standstill of the own vehicle.

A device and a method for detecting a free parking space is known from DE 10 2009 012 435 B4. It provides detecting an image sequence by detecting the images of free parking spaces with a vehicle rearview imaging apparatus or camera, three-dimensionally reconstructing the view behind the vehicle, or respectively automobile, using point correspondences in the image sequence, and recovering metric information about the 3-D structures by using the known camera height, and detecting free parking spaces by estimating the positions of adjacent vehicles. An evaluation of the accuracy while estimating the corner points and orientations of the adjacent vehicle is also provided.

A disadvantage of the aforementioned devices and methods is that measurement artifacts are not recognized as such. This is particularly problematic when objects or parts of objects that are saved in a map of the surroundings are deleted due to measurement artifacts even though they still exist unchanged at their original position. Such a measurement artifact occurs, for example, in the pulse echo measuring method when the surface of an object is aligned so that a majority of the output emitted by the sensor is not reflected back toward the sensor but away from the sensor. Since the sensor does not measure any reflection from the direction of the object, or respectively from the location of the object, the measurement data are misinterpreted. The area in the surroundings of the sensor, i.e., the vehicle, assumed by the object or a part of the object is classified as a free area. In a fusion of the measurement data following the measurement, a free area is incorrectly assumed at the position of the object or part of the object, and the probability of existence assigned to the object or part of the object is reduced, or the object or part of the object is assumed to no longer exist.

SUMMARY

A problem thus exits to provide a method and a device for detecting surroundings in which data fusion is improved.

The technical object is solved according to the invention with a method and a device having the features of the corresponding independent claims. Various embodiments will become apparent from the dependent claims and the following description.

Basic Concept

An underlying concept of a first aspect is that areas in which objects positioned in the surroundings have a surface that does not reflect a measuring signal emitted by the sensor back to the sensor due to their orientation are not taken into account when fusing the measurement data. A core concept is to assign recognized objects in the surroundings at least one orientation attribute. For this, objects measured in the measurement data from the surroundings detected by at least one sensor are recognized and orientation attributes are estimated for the recognized objects. In fusing the data, the probability of the existence of an object saved in the map of the surroundings is then reduced depending on the orientation attribute.

BRIEF DESCRIPTION OF THE DRAWINGS

Additional features and embodiments of the present invention are described in the following description and the appended claims. In the following:

In some embodiments, an orientation attribute may be a surface orientation. These surface orientations are estimated for recognized objects, linked to the recognized objects, and saved in a map of the surroundings. If, while subsequently detecting the surroundings for an area in the measuring area of a sensor, a free area is measured, it is checked whether an object is saved in the map of the surroundings in the corresponding area. If an object is saved in the map of the surroundings for the area of the sensor area, a measuring angle to this saved object is estimated. This means that the measuring angle for an extended object is determined for the part of the object that is located within the measured free area. Then the at least one surface orientation linked to the saved object is retrieved from the map of the surroundings. Then a differential angle is determined from the estimated measuring angle and the at least one surface orientation, such as a surface normal, of the saved object. If the determined differential angle exceeds a threshold value, the probability of existence of the object is not reduced while fusing or is reduced by a lesser amount, and the measurement data in the area are rejected.

An advantage some embodiments is that the measurement artifacts which incorrectly display free areas that occur due to reflections, for example on an object's surface at a sharp angle, are recognized and correspondingly taken into account when fusing, e.g., may be rejected. They therefore cannot impair or distort the updating of the map of the surroundings. Taking into account orientation attributes of the recognized objects such as surface orientations makes it possible to estimate in a measurement the orientation of the surface of an object saved in the map of the environment and therefore identify an angle that is problematic for a measurement. Areas that appear as free areas due to a measurement signal reflected by an object's surface completely away from the sensor are then not misinterpreted as free areas. The accompanying measurement data are rejected while fusing and the object is then saved with the same probability of existence in the map of the surroundings.

This improves the imaging of the motor vehicle's surroundings in the map of the surroundings which enables assistance systems that access the map of the surroundings to work more reliably and safely.

Definitions

In the following, a sensor designates a measuring sensor that is suitable for detecting objects with spatial resolution in a surrounding of a motor vehicle. A sensor can, for example, be an ultrasonic sensor, a radar sensor, an infrared sensor, an imaging system (TopView/AreaView, etc.) or a laser scanner.

A measurement artifact is a measurement result that only occurred due to the properties of the employed measuring method. In the following, a measurement artifact designates in particular a measurement result of a sensor operating by a pulse echo method that occurred from a transmitted signal reflected largely or entirely away from the sensor instead of being reflected back and therefore incorrectly appears as a free area. The term echo is understood here in a broad sense and is not restricted exclusively to acoustic signals. Reflected electromagnetic waves of a transmitted radar pulse from a radar sensor and a reflected light pulse from a LIDAR sensor are, for example, echoes within the meaning of the present description. In this context, LIDAR is the abbreviation of the English expression "laser detection and ranging".

A free area is an area in the surroundings of the motor vehicle in which there are no objects or respectively obstacles. For example, an empty road or an empty parking space is such a free area.

An orientation attribute is a property linked to an object or a part of the object that describes the orientation of the object or of parts of the object. For example, a surface orientation or a surface normal can be such an orientation attribute. Multiple orientation attributes can be assigned to one object. An orientation attribute can advantageously be assigned to different locations or positions on the surface contour of an object.

A surface contour is an outline of an object that delimits the object from its surroundings. A surface normal can be assigned to each point or section on the outside of the surface contour. Such a point or section is hence a part of the object.

A measuring angle is the angle at which a measuring signal sent by the sensor contacts a surface of an object or a part of the object positioned in the surroundings. If the measuring signal contacts the surface, for example, at a right angle, the measuring angle is by definition, for example, 0°; in contrast, if the direction of propagation of the measuring signal runs parallel to the surface, then the measuring angle is by definition 90°.

A vector that runs from the measuring sensor to the position of the object's surface to be measured is termed the measuring vector.

The quality of a sensor is a value that expresses the quality of the sensor in comparison to other sensors of the same or a different type. For example, a spatial resolution of a sensor can express such a quality. In this regard, a sensor quality increases, for example, with a spatial resolution capability. That is, the finer the spatial resolution with which the surroundings can be detected, the greater the quality in terms of spatial resolution.

The estimation of a quantity comprises ascertaining this quantity even when an estimation method is not used.

The expression "recognizing an object" expresses that an existence or probability of existence for the existence of an obstacle is determined for a position or an area in the surroundings from measurement data from a sensor. In this regard, it is not essential to ascertain whether or not objects recognized in this manner belong to the same object in the surroundings. Initially, object positions are therefore ascertained. In some embodiments, each obstacle position or object position ascertained in this manner is considered an object. This frequently applies in particular for embodiments in which the object positions are saved in a cellular map. In this case, a cell of the cellular map is assigned to an area of the surroundings. Depending on the employed measuring method and an employed evaluation procedure, object positions ascertained on the basis of the measuring values are, however, also combined in some embodiments into an object that is then saved in the map. In this case as well, the map can be a cellular map. The fact that a combination of different detected object positions that are assigned to the same real object in the surroundings has not occurred in the map and the object positions are hence treated as individual objects is irrelevant to the present discussion. It is only relevant that an orientation attribute can be assigned to the object position. If, for example, an obstacle in the form of a flat wall running straight along the road and oriented perpendicular to the road surface is in the surroundings, the existence of the wall will be identifiable by a runtime measurement along the extension at different positions, and a series of object positions will therefore be ascertained. As a result of the straight trajectory, the same normal vector to the wall surface can be assigned to all of these object positions as an orientation attribute. Whether the object positions are each treated in the map as individual objects with just one orientation attribute in the form of the normal vector or the extension of the wall and its position are saved in the map together with the normal vector is immaterial to the present discussion. What is important is that an orientation attribute can be ascertained for a position at which an object position is saved in the map when a subsequent measurement displays a free area for this position.

In a map of the surroundings, probabilities of existence are generally assigned to objects and/or object positions. In simple maps of the surroundings, there are only the values "existent" and "nonexistent" that, for example, are expressed with the numbers "1" and "0". Other maps of the surroundings have gradations.

The measuring area of the sensor is designated as the sensor area. The measuring area is the area of the surroundings about which a sensor measurement provides information on the surroundings.

EMBODIMENTS

In some embodiments, a method for improved data fusion during detection of the surroundings in a motor vehicle that comprises the following steps is provided: Detecting a surrounding of the motor vehicle with at least one sensor, recognizing objects in measurement data detected by the at least one sensor, fusing the recognized objects and their object positions in a map of the surroundings, wherein a probability of existence is or will be assigned to objects saved in the map of the surroundings, and wherein the probability of existence of a saved object is reduced when a free area is measured at the position of the saved object during the detection, wherein at least one orientation attribute is assigned to the objects saved in the map of the surroundings and is saved in the map of the surroundings, and for an area in the sensor area of the at least one sensor in which a free area is measured, the probability of existence of an object, which is saved in the area of the map of the surroundings corresponding to the area, is reduced depending on the at least one assigned orientation attribute of the saved object.

Moreover, a device for executing the above method is provided that comprises: at least one sensor for detecting a surrounding of a motor vehicle, an object recognition apparatus for recognizing objects, a fusing apparatus for fusing the recognized objects and their object positions in a map of the surroundings, wherein the fusing apparatus is designed to assign objects saved in the map of the surroundings a probability of existence and to reduce the probability of existence of a saved object when a free area is measured at the position of the saved object during the detection, and a controller, wherein the fusing apparatus comprises an artifact recognition apparatus, wherein the artifact recognition apparatus is designed to assign at least one orientation attribute to the objects saved in the map of the surroundings, and for an area in the sensor area of the at least one sensor in which a free area is measured, to reduce the probability of existence of an object which is saved in the area in the map of the surroundings corresponding to the area, depending on the at least one assigned orientation attribute.

The orientation attributes assigned to the individual objects can already be saved in the map of the surroundings; however, they can also be initially generated based on the current measurements. An embodiment therefore provides that the orientation attribute is estimated based on the measurement data detected by the sensor. The advantage is that even when new objects that are not yet saved in the map of the surroundings are recognized, these new objects can also be assigned orientation attributes for the mapping. For estimating, different methods can be used such as pattern recognition methods, linear regression methods or statistical methods as well.

When estimating the orientation attribute, it can be beneficial to use not just one or a few object positions of an object to estimate the orientation, but also to take into account adjacent object positions. Consequently, another embodiment provides that adjacent object positions are also taken into account when estimating the orientation attribute. In this case, the adjacent object positions do not have to be assigned to the same object. I.e., even when, for example, the recorded object positions in a map are interpreted as being individual objects, the adjacent object positions can be used for estimating the orientation attribute. A surface contour in the surroundings can be formed by one object or multiple adjacently arranged objects. Frequently, however, adjacent recognized objects or object positions originate from different locations on the same object due to reflections. The surface contour can be ascertained using the recognized object positions independent of whether or not an assignment of the recognized object positions to objects that correspond to real objects has occurred correctly.

In addition to estimating the orientation attribute for recognized objects in currently detected measurement data, it is also possible to estimate orientation attributes for objects that are already saved in the map of the surroundings. Consequently, an embodiment provides that at least one orientation attribute is estimated additionally or alternately based on the objects saved in the map of the surroundings, and the estimated orientation attribute is assigned to the saved objects. This can, for example, be beneficial when orientation attributes can be determined for objects saved in the map of the surroundings in times in which computing power in the motor vehicle is available or otherwise remains unused. This can, for example, be beneficial with regard to the spatial resolution or number of orientation attributes. In times in which a great deal of computing power is requested, for example, when parking using a parking assistant, the previously estimated orientation attributes can then be accessed. This prevents or at least minimizes bottlenecks in the computing power.

If measurement data are available from multiple sensors, the quality of each of the sensors is decisive for the quality of the measurement data detected by this sensor. Accordingly, a sensor with a greater spatial resolution has at least a better quality than a sensor with a lower spatial resolution. The quality can, however, also be dependent, for example, on a current environment situation such as the weather.

Consequently, an optically functioning sensor will provide worse results in fog despite potentially higher spatial resolution than, for example, a radar sensor for which fog is negligible. Consequently, an embodiment provides that a quality of the at least one sensor is taken into account when estimating the at least one orientation attribute.

It can also be desirable to not take a single measurement as the basis for estimating the orientation attribute of a detected object, but rather to use multiple sequentially detected measurements. An embodiment therefore provides that multiple orientation attributes estimated for a recognized object and/or an object saved in the map of the surroundings are fused into a single orientation attribute.

If this is impossible, it can be beneficial to always take the last estimation for the orientation attribute as the currently valid estimation. Consequently, it is provided in this case that only the orientation attribute that was estimated as the last one chronologically for a recognized object is saved in the map of the surroundings. Accordingly, despite there being fewer measurement data, a current picture of the surroundings of the motor vehicle is always available.

When estimating the orientation attribute, it can be beneficial to include more extensive relationships that better describe the properties of the object. Consequently, another embodiment provides that, for each recognized object, a surface contour is estimated and the orientation attribute is estimated based on the estimated surface contour, wherein for each recognized object for which a surface contour cannot be estimated, the orientation attribute is estimated based on a measuring angle determined for this object. This accordingly always ensures that each recognized object is or will be assigned an orientation object, even when there are only very few measurement data on this recognized object.

In this case as well, the quality of the estimation can be improved when not just one but multiple measurements are included in the estimation. Consequently, it can be beneficial to realize an embodiment that provides that the surface contour of a recognized object is estimated by combining multiple chronologically sequential measurements.

An embodiment is particularly beneficial in which multiple sensors are used to detect the surroundings of the motor vehicle. Accordingly, such an embodiment provides that the surroundings of the motor vehicle are detected by at least one additional sensor using a different measuring method, and the detected measurement data are taken into account when estimating the orientation attribute. In this case, a quality of the employed sensors can also again be taken into account when estimating the orientation attribute. It is then also possible to take into account orientation attributes that have been determined with the assistance of a sensor that functions according to one measuring method when fusing the measurement data that were determined with another sensor that functions according to another measuring method. Accordingly, for example, the orientation attribute of a recognized object can be determined based on measurement data that were detected using a laser scanner. If the orientation attribute to this recognized object is saved in the map of the surroundings, the saved orientation attribute can thus be accessed in a subsequent measurement, for example using an ultrasonic sensor.

It is beneficial when the measurement data detected by the at least one additional sensor are taken into account in a weighted manner when estimating the orientation attribute. A quality of the employed sensors or a time of the detected measurement data are possible parameters that can be taken into account in the weighting.

It can be beneficial when the orientation attribute is a surface orientation. Such a surface orientation makes it possible to very effectively estimate the reflection behavior of a pulse emitted by a sensor on an associated surface and thereby identify measurement artifacts that arise based on a reflection that is mostly or entirely directed away from the sensor. In particular with ultrasonic sensors, this problem occurs frequently; however, this problem also occurs with optical sensors such as laser scanners or radar sensors.

In this regard, an embodiment can be realized which provides that the surface orientation will be or is assigned a surface normal. It is then particularly easy to determine the surfaces of recognized objects that have an orientation that is problematic for detection.

An embodiment therefore provides that the probability of existence of the saved object is not reduced while fusing when a differential angle formed from a measuring angle and the surface normal exceeds a threshold value. Accordingly, it can be easily estimated on the basis of the surface normals saved in the map of the surroundings whether or not a problematic reflection has occurred. As a guide value for ultrasound-based measurements, a threshold value for the differential angle of about 45° is beneficial. For laser scanner-based detection of the surroundings, the threshold value for the differential angle is somewhat larger; in this case, it is about 65° to 70°.

The reflected intensity of a runtime measurement such as a pulse echo measurement also depends, in addition to the angle ratios between the propagation direction of the emitted pulse and the surface orientation of the obstacle, on the signal attenuations between the measuring sensor and obstacle as well as between the obstacle and measuring sensor after reflection. Even with a directionally emitted pulse, there is generally a spatial expansion of the emitted pulse so that the intensity per reflected surface decreases. In addition, other attenuation effects arise that generally manifest a dependence on the traveled path. I.e., the intensity of the pulse contacting an object in the surroundings is already attenuated. After the reflection, frequently a bundling character of the pulses is not retained. A reflection frequently occurs within a wide angular range. This is frequently because the intensity to be measured locally decreases further with the distance from the reflected obstacle. The detected intensity accordingly decreases with the distance between the sensor and obstacle or object while the geometric conditions otherwise remain the same. Since problematic orientations of the obstacle also lead to a reduction of the reflected intensity, these two processes are amplified. Consequently, an embodiment provides that the employed threshold value for an angular size, for example the differential angle between the measuring vector and surface orientation, is ascertained or selected depending on the ascertained distance of the position of the object saved in the map from the measuring sensor. For example, the threshold value for the maximum differential angle between the measuring vector and surface normal can be ascertained until free areas are taken into account as free areas in fusing at an object position in the map by using a threshold function that depends on the distance. With small distances, the threshold value for the differential angle is greater than with large distances. With very small distances of, for example, 25 cm, an emitted pulse intensity is so high, for example with ultrasonic sensors, that an echo pulse which is detectable is generally returned even from very flat striated objects (a measuring angle of almost 90° measured against the surface normal).

In the following, the invention will be explained in greater detail using further exemplary embodiments with reference to the FIGS.

Figure 1:
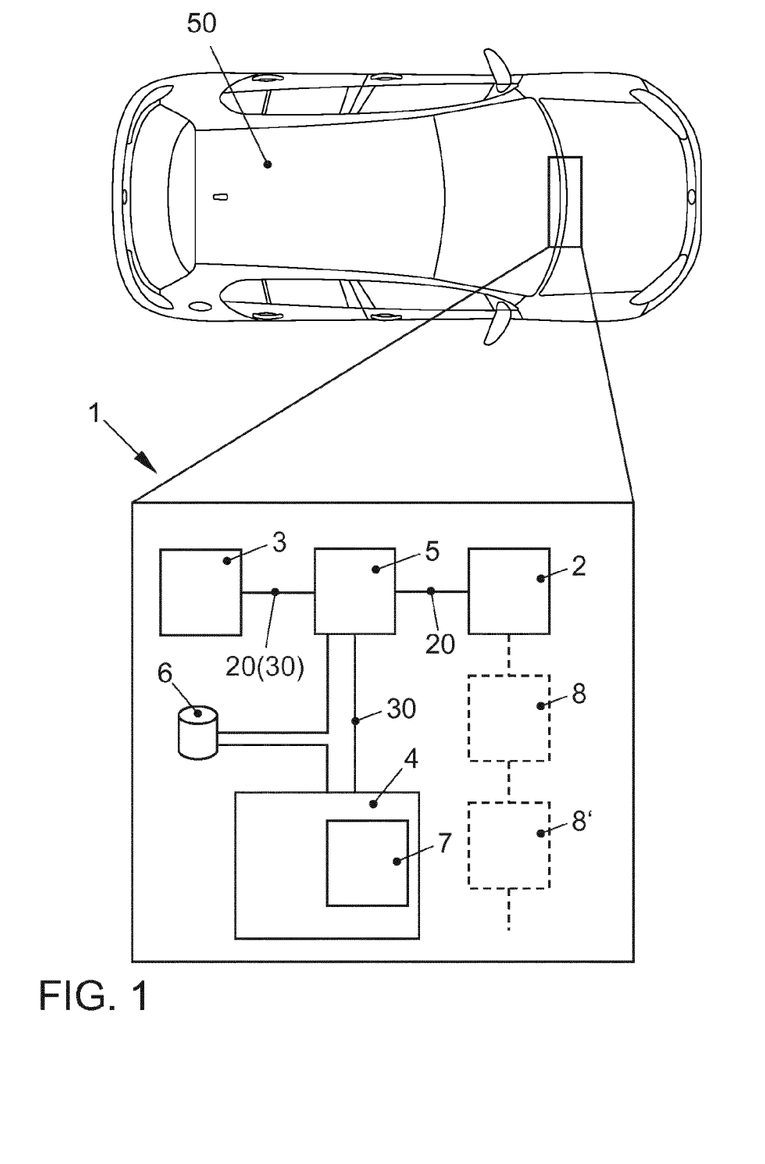
FIG. 1 shows a schematic representation of an embodiment of the device for improved data fusion when detecting the surroundings in a motor vehicle.

FIG. 1 shows an embodiment of the device 1 for improved data fusion when detecting the surroundings in a motor vehicle 50. The device 1 comprises at least one sensor 2, an object recognition apparatus 3, a fusing apparatus 4 and a controller 5. The controller 5 can access a memory 6 in which a map of the surroundings with objects, object positions and orientation attributes is saved. The fusing apparatus 4 comprises an artifact recognition apparatus 7 and can also access the memory 6. Optionally, the device 1 comprises additional sensors 8, 8'.

The method according to the present aspect is then performed as follows in the device 1. The at least one sensor 2 detects the surroundings of the motor vehicle 50. The measurement data 20 detected by at least one sensor 2 are then forwarded by the controller 5 to the object recognition apparatus 3. The object recognition apparatus 3 recognizes objects in the measurement data and object positions belonging to the recognized object. Likewise, the object recognition apparatus 3 recognizes free areas in which there are no objects. The objects, the object positions, and the positions of the free areas are forwarded as data 30 via the controller 5 to the artifact recognition apparatus 4. The artifact recognition apparatus 4 then checks whether objects are saved in the map of the surroundings at positions of the free areas. For this, the artifact recognition apparatus 4 runs a corresponding query in the memory 6. If an object is saved, the artifact recognition apparatus 4 retrieves the orientation attribute saved for this object. For example, such an orientation attribute can be a surface normal of the recognized object. After the retrieval, the artifact recognition apparatus 4 estimates a measuring angle of the at least one sensor 2 to the recognized object and determines a differential angle from the estimated measuring angle and the retrieved at least one surface normal. If the determined differential angle exceeds a threshold value that, for example, depends on the employed at least one sensor, the measurement data that belong to the free area are not taken into account in data fusion. The recognized objects and their object positions are, in contrast, saved in the map of the surroundings by being fused with the already saved objects.

Figure 2:
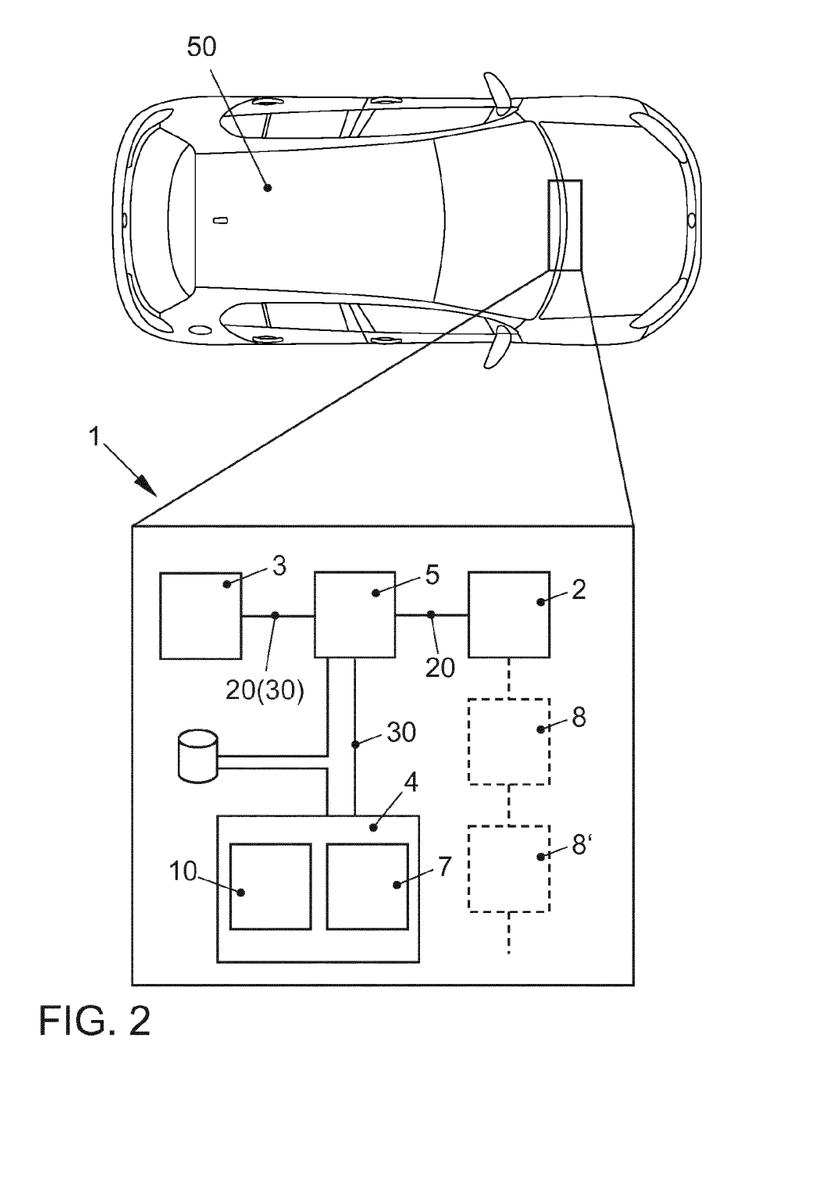
FIG. 2 shows a schematic representation of a further embodiment of the device for improved data fusion when detecting the surroundings in a motor vehicle.

FIG. 2 schematically portrays a further embodiment of the device 1. It largely corresponds to the embodiment shown in FIG. 1. The same reference numbers designate the same features. The artifact recognition apparatus 4, however, also comprises an estimating apparatus 10.

The estimating apparatus 10 performs estimations of at least one orientation attribute in each case for recognized objects in the data 30 that were forwarded by the controller 5 to the artifact recognition apparatus 4. For example, let a surface normal again be assumed as an orientation attribute in this case. For each recognized object, the estimating apparatus 10 estimates at least one surface normal, for example by first estimating a surface contour of the recognized object, and then estimating at least one surface normal to this surface contour. Generally, the estimated surface contours that are extended have different surface normals at different positions. Several surface moments can therefore be assigned to one object or one surface contour. The assignment depends on the position. Alternatively or in addition, corresponding surface contours and surface normals can also be estimated for objects saved in the map of the surroundings. The estimated surface normals are then assigned to the recognized objects and linked with them in the map of the surroundings and saved in the memory 6. In this manner, they can be presented and retrieved for subsequently recognizing measurement artifacts.

Figure 3:
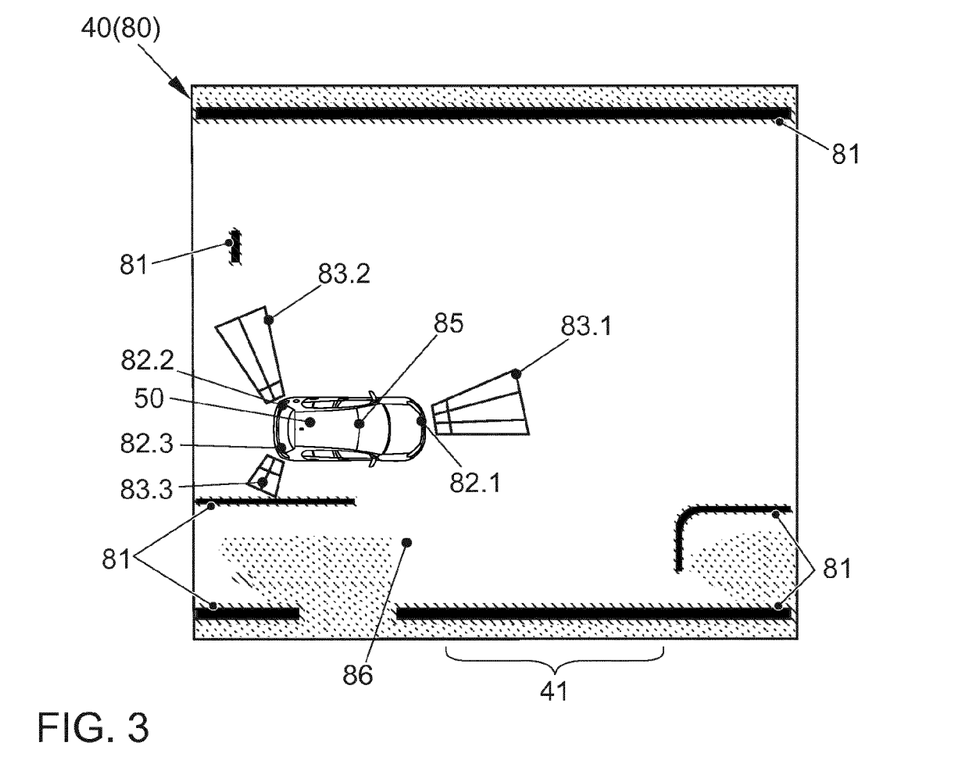
FIG. 3 shows a schematic representation of measurement data of a surrounding of a motor vehicle.

FIG. 3 shows typical surroundings 40 of a motor vehicle 50 when approaching a parking space 41. The representation is based on experimentally recorded measurement data. The motor vehicle 50 approaches a parking space 41 and detects the surroundings 40 by means of a laser scanner 85 and multiple ultrasonic sensors 82.1, 82.2, 82.3. The ultrasonic sensors 82.1, 82.2, 82.3 each have a sensor area 83.1, 83.2, 83.3 that they are currently measuring. In comparison to the ultrasonic sensors 82.1, 82.2, 82.3, the laser scanner 85 has a greater range. A map of the surroundings 80 in which the objects 81 and free areas 86 are saved is created from the measurement data of the surroundings 40 detected by the laser scanner 85 and the ultrasonic sensors 82.1, 82.2, 82.3. Moreover, there are also areas that have been recognized by the sensor as inaccessible since they fall in the shadow of a recognized object. These areas are shown in FIG. 3 as lightly hatched. The free areas 86 do not contain any hatching. In subsequent measurements, the measurement data from the current measurement are fused with the measurement data from the measurements already saved in the map of the surroundings 80 by performing the method according to the description herein.

Figure 4A:
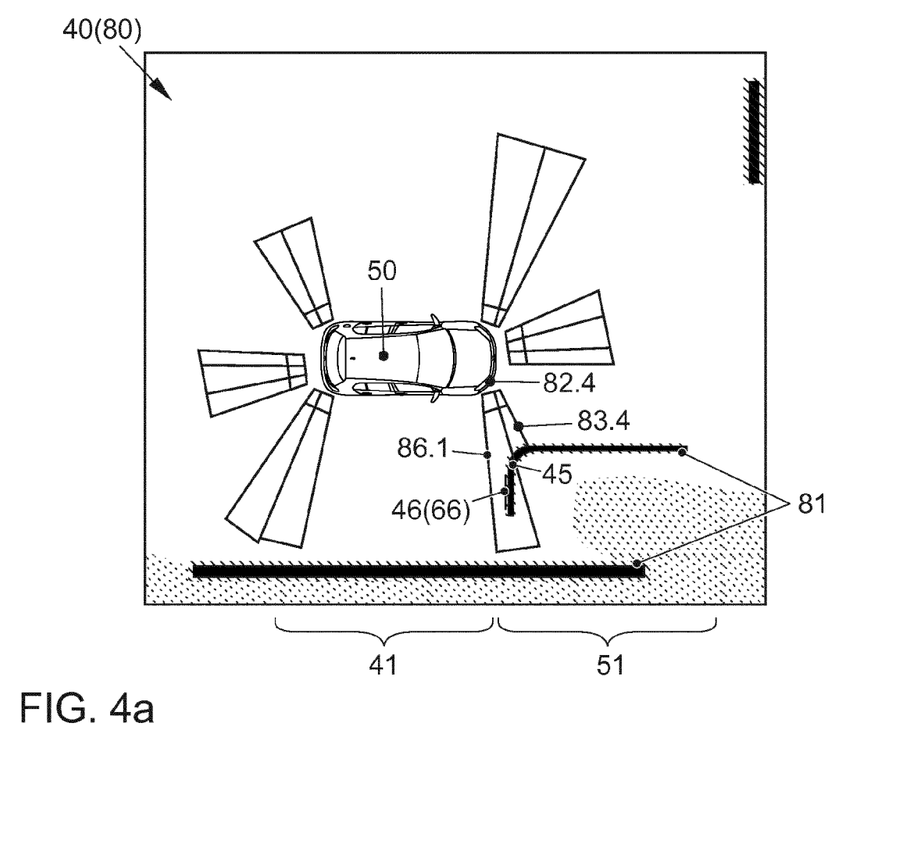
FIG. 4a shows a schematic representation of superimposed measurement data of the surroundings of the motor vehicle and the corresponding section of the map of the surroundings from FIG. 3 at a later time.

FIG. 4a shows the same surroundings 40, or respectively the same map of the surroundings 80 at a later time. Measurement data that are currently being detected and the objects 81 saved in the map of the surroundings 80 are portrayed superimposed. The motor vehicle 50 has traversed a distance in the timespan to the later point in time and is located directly parallel next to the parking space 41 at the later point in time.

The front right ultrasonic sensor 82.4 of the motor vehicle 50 now detects a sensor area 83.4 in which a backside 45 of a parking motor vehicle 51 is located. The contour 46 of the surface of the backside 45 of the parking motor vehicle 51 is partially oriented, or respectively has such a surface orientation 66, so that the measuring signal 71 emitted by the ultrasonic sensor contacts the surface at a very sharp angle. Since only very little or no output is reflected by this part, this area mistakenly appears in a measurement as a free area 86.1.

Figure 4B:
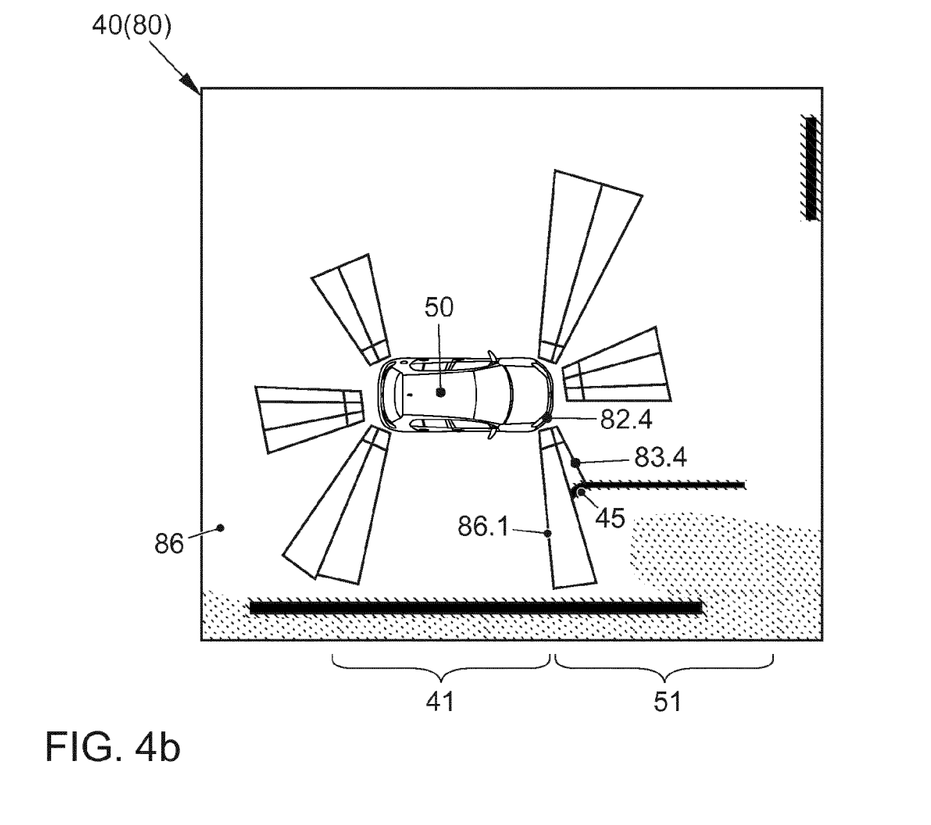
FIG. 4b shows a schematic representation as in FIG. 4a; however, only the measurement data of the surroundings of the motor vehicle are depicted.

FIG. 4b shows the same situation as FIG. 4a; however, only the current measurement data are portrayed. One can clearly see the free area 86.1 measured by the front right ultrasonic sensor 82.4 that arises based on the contour 46, depicted in FIG. 4a, of the backside 45 of the parking motor vehicle 51, and the direction of reflection caused thereby.

Figure 5:
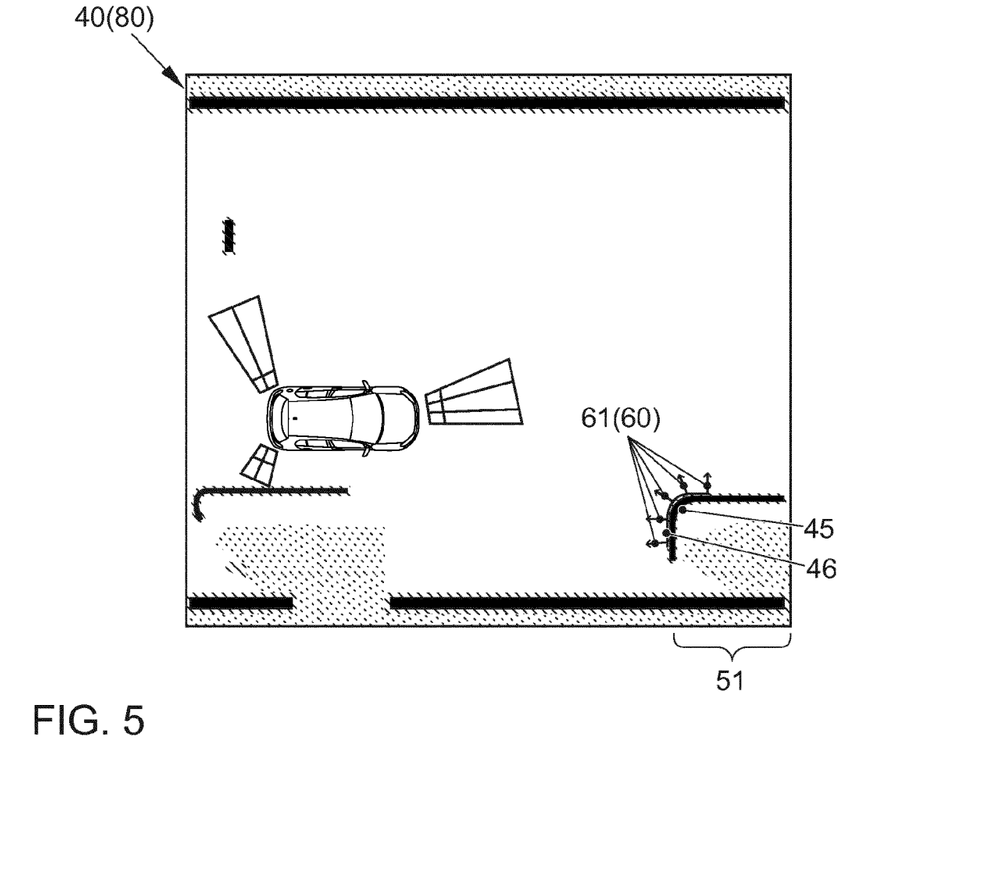
FIG. 5 shows a schematic representation of measurement data of the surroundings of the motor vehicle as in FIG. 3 to explain embodiments of the invention.

FIG. 5 shows the same situation in the surroundings 40 of the motor vehicle 50 as in FIG. 3. The same reference numbers designate the same objects. To solve the problems indicated in FIG. 4b, the contour 46 of the backside 45 of the parking vehicle 51 is assigned at least one orientation attribute 60 in the method according to the description herein. Here, the recognized object, the backside 45 of the motor vehicle 51, is assigned multiple orientation attributes that are each formed as surface normals 61 in a row on the contour 46 facing different directions. The surface normals 61 are, for example, estimated by evaluating the contour 46.

Figure 6A:
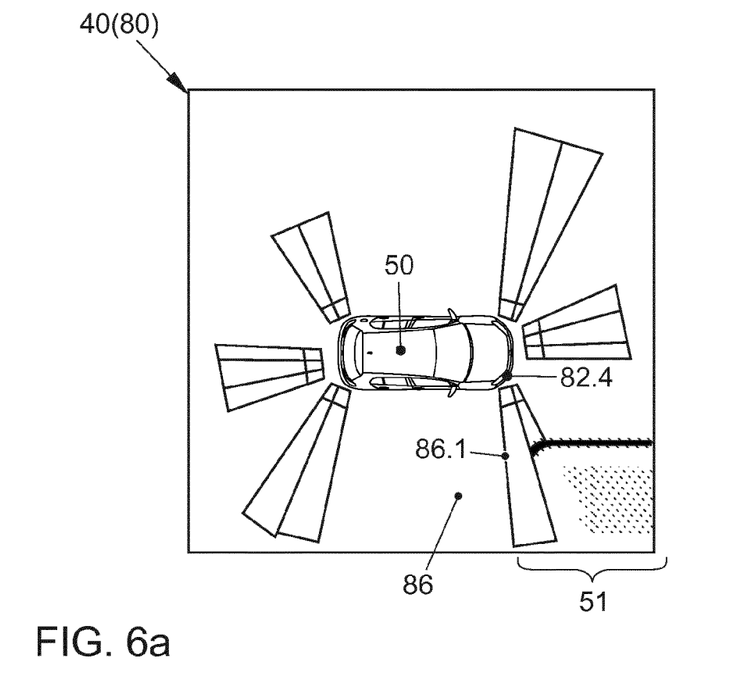
FIG. 6a shows a schematic representation of measurement data of the surroundings of the motor vehicle as in FIG. 5 at a later time to explain embodiments of the invention.

The same situation is shown in FIG. 6a as in FIG. 4b. The right front ultrasonic sensor of the motor vehicle 50 measures a free area 86.1. Since the free area 86.1 has been measured, it is checked whether an object 81 is saved in the map for the same area.

Figure 6B:
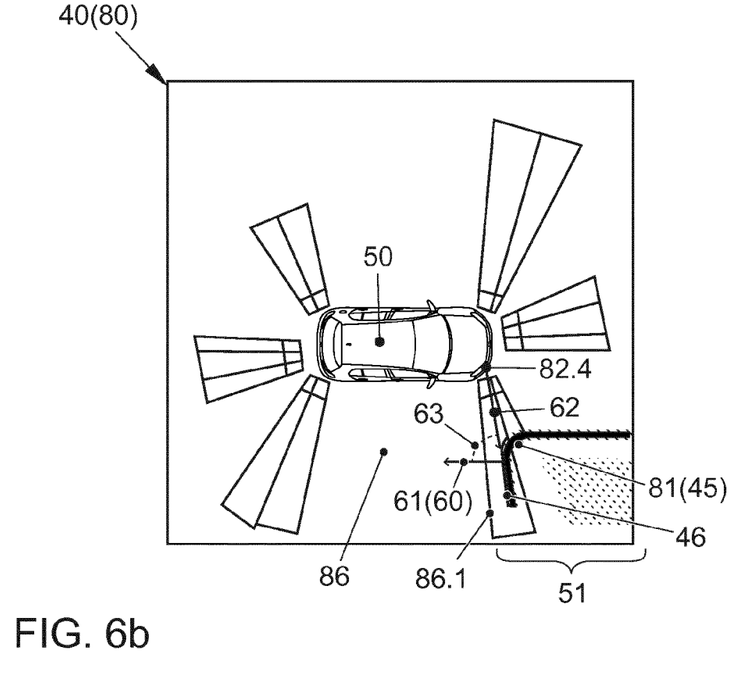
FIG. 6b shows a schematic representation of superimposed measurement data and objects saved in the map of the surroundings for the same situation as the one shown in FIG. 6a to explain a determination of a differential angle.
Figure 6C:
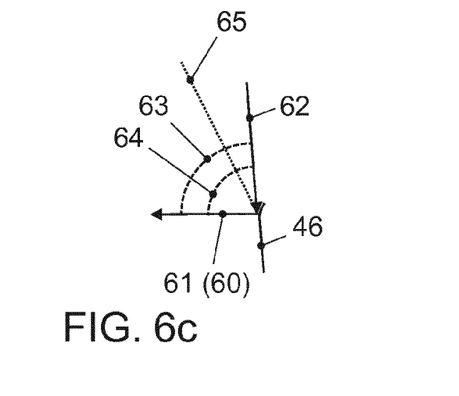
FIG. 6c shows a schematic representation to explain a determination of a differential angle.

Here, the check reveals that an object 81 is saved in the map that belongs to the backside 45 of the parking motor vehicle 51. This is schematically represented in FIG. 6b in which both the currently detected measurement data as well as the objects 81 saved in the map of the surroundings 80 are depicted superimposed. Then a measuring angle 64 (see also FIG. 6c) or a measuring vector 62 of the saved object is determined in the map of the surroundings 80 with regard to the current position of the motor vehicle 50, or respectively the right ultrasonic sensor 82.4. The at least one saved orientation attribute 60 for the saved object 81, in this case the surface normal 61, is requested from the map of the surroundings 80.

A differential angle 63 is determined from the measuring angle 64 or the measuring vector 62 and the surface normals 61. If the differential angle 63 exceeds a threshold value 65, the detected measurement data that display a free area at the position of the saved object 81 are rejected and not taken into account when fusing the current data with the data already saved in the map of the surroundings 80 since they are only based on a measurement artifact. The probability of existence assigned to the backside 45 of the parking vehicle 51 is therefore not changed.

Figure 7:
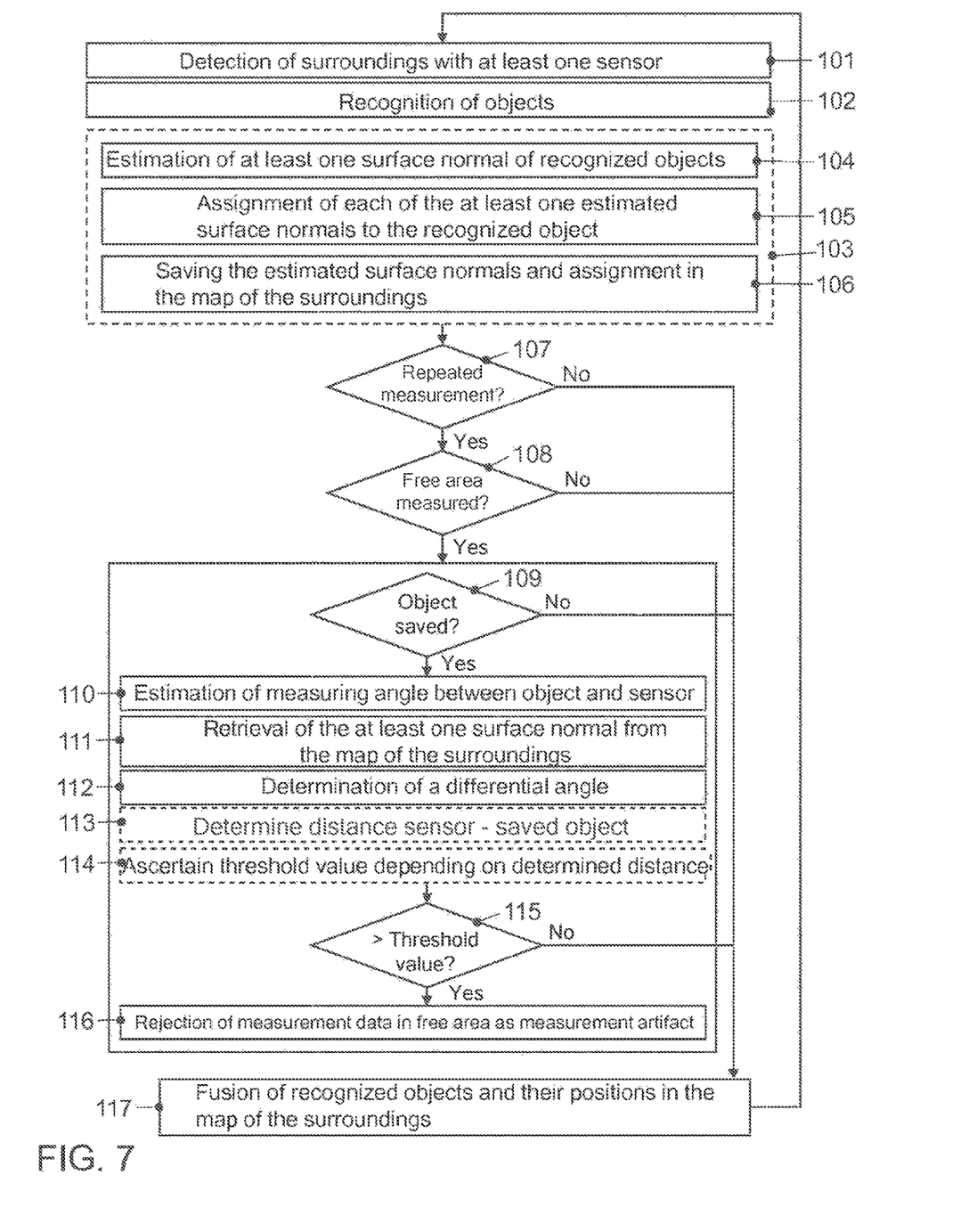
FIG. 7 shows a schematic flow chart of the method.

FIG. 7 shows a schematic flow chart of the method for improved data fusion when detecting the surroundings. In a first method step, a surrounding of the vehicle is detected 101 with at least one sensor. Then objects are recognized 102 in the detected measurement data. Optionally, at least one orientation attribute can be estimated 103 at the recognized objects. The estimation of at least one surface normal as an orientation attribute is particularly advantageous. If only individual object positions in the surroundings are determined during measurement or it is impossible to ascertain a surface contour for other reasons, the orientation attribute is estimated in one embodiment for each determined object position with the assistance of the measuring vector (see FIG. 6c). It is assumed that the reflection of the measuring signal by means of which the object position was ascertained is co-linear with the surface normal of the surface of the object located at the ascertained position. I.e., the orientation attribute is a normal vector that is oriented co-linear with and opposite the measuring vector from the measuring sensor to the ascertained object position. If the orientation attribute is estimated 104, it is assigned 105 to the respective recognized object and then saved with the assignment in the map of the surroundings 106. In a repeated detection 107 of the same area in the surroundings, it is queried whether a free area was measured 108 in a measured area. If a free area was measured, the method steps 109 to 114 follow. First, it is checked whether an object is saved 109 in the map of the surroundings for the area in which the free area was measured. If an object is saved, a measuring angle of the at least one sensor to the saved object is estimated 110. The saved surface normal to the saved object is retrieved from the map of the surroundings 111. From the measuring angle and the saved surface normal, a differential angle is determined 112. Then it is checked 115 whether the differential angle exceeds a threshold value. In one embodiment, the threshold value is chosen depending on the distance. This means that the distance of the recognized object saved in the map, or more precisely the distance from the object position saved in the map from the sensor, is determined 113, and then the threshold value is ascertained 114 using the determined distance. In some embodiments, this occurs on the basis of a reference table in which threshold values are saved for distances or distance ranges. In other embodiments, the threshold value is calculated by means of a function that depends on the determined distance. If the comparison of the differential angle and threshold value reveals that the threshold value is exceeded, the detected measurement data for the area are rejected as a measurement artifact 116; they are not taken into account in the data fusion 117 performed at the end of the method. If real free areas are measured, or respectively objects are recognized in the detected measurement data, they are fused 117 with the already saved objects and free areas in the map of the surroundings. Then the method can be performed from the beginning.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

REFERENCE NUMBER LIST

1 Device
2 Sensor
3 Object recognition apparatus
4 Fusing apparatus
5 Control
6 Memory
7 Artifact recognition apparatus
8, 8' Additional sensors
10 Estimating apparatus
20 Measurement data
30 Data
40 Surroundings
41 Parking space
45 Backside
46 Contour
50 Motor vehicle
51 Parking motor vehicle
60 Orientation attribute
61 Surface normal
62 Measuring vector
63 Differential angle
64 Measuring angle
65 Threshold value
66 Surface orientation
80 Map of the surroundings
81 Object
82.1 Ultrasonic sensor
82.2 Ultrasonic sensor
82.3 Ultrasonic sensor
82.4 Front right ultrasonic sensor
83.1 Sensor area
83.2 Sensor area
83.3 Sensor area
85 Laser scanner
86 Free area
86.1 Free area
101-117 Method steps

What is claimed is:

1. A method for improved data fusion during detection of the surroundings in a motor vehicle comprising:
   detecting a surrounding of the motor vehicle with at least one sensor and providing measurement data;
   retrieving a stored map of the surrounding, which map comprises at least one saved object and at least one orientation attribute that is assigned to at least one saved object, wherein the at least one orientation attribute comprises a surface normal, and wherein a probability of existence is assigned to the at least one saved object;
determining an angle at which a measurement signal is sent by the at least one sensor;
calculating a differential angle for the at least one saved object based on a difference between the surface normal of the at least one saved object and the determined angle;
determining, whether the differential angle exceeds a threshold value for the at least one saved object;
determining from the measurement data, whether a free area is present in the surrounding of the motor vehicle, in which free area, no objects are recognized;
determining, whether a position of the at least one saved object matches the free area; and
fusing the recognized one or more objects and the respective object positions with the stored map of the surrounding; wherein
during the fusing, if it is determined that the position of the at least one saved object matches the free area, the probability of existence of the at least one saved object is reduced, unless it is determined that the differential angle exceeds the threshold value for the at least one saved object.

2. The method of claim 1, comprising adjusting the threshold value based on a distance between the at least one sensor and the at least one saved object.

3. The method of claim 2, wherein adjusting the threshold value based on the distance is conducted based on a reference table in which threshold values are stored for distances or distance ranges.

4. The method of claim 2, wherein adjusting the threshold value based on the distance is conducted using a function that depends on the determined distance.

5. The method of claim 1, wherein determining the angle at which the measurement signal is sent by the at least one sensor comprises estimation of the angle at which the measurement signal is sent.

6. The method of claim 1, wherein the recognized objects are linked to positions of a global coordinate system.

7. A method for improved data fusion during detection of the surroundings in a motor vehicle comprising:
detecting a surrounding of the motor vehicle with at least one sensor and providing measurement data;
determining from the measurement data, whether at least one free area is present in the surrounding of the motor vehicle, in which free area, no objects are recognized; and
in case at least one free area is present: determining from a map of the surrounding, whether at least one object is saved in the map; wherein
in case at least one object is saved in the map:
determining a measuring angle of the at least one sensor to the at least one object, saved in the map;
retrieving a saved surface normal of the at least one object from the map;
determining a differential angle between the measuring angle and the saved surface normal;
determining, whether the differential angle exceeds a threshold value; and
in case the differential angle exceeds the threshold value, rejecting the measurement data for the free area as a measurement artifact.

8. The method of claim 7, comprising adjusting the threshold value based on a distance between the at least one sensor and the at least one saved object.

9. The method of claim 8, wherein adjusting the threshold value based on the distance is conducted based on a reference table in which threshold values are stored for distances or distance ranges.

10. The method of claim 8, wherein adjusting the threshold value based on the distance is conducted using a function that depends on the determined distance.

11. The method of claim 7, wherein determining the measuring angle comprises estimation of the measuring angle.

12. The method of claim 7, wherein the at least one object is linked to a position of a global coordinate system.

* * * * *